United States Patent [19]

Isono

[11] Patent Number: 5,367,130

[45] Date of Patent: Nov. 22, 1994

[54] GRAPHICS TABLET SCANNING AND ERROR REDUCTION

[75] Inventor: Ko Isono, Fremont, Calif.

[73] Assignee: Apple Computer, Inc., Cupertino, Calif.

[21] Appl. No.: 889,552

[22] Filed: May 27, 1992

[51] Int. Cl.$^5$ .................. G08C 21/00; G06K 9/00
[52] U.S. Cl. ........................... 178/18; 382/3
[58] Field of Search ............ 178/19, 18, 20; 340/706; 382/3, 13; 345/173, 174, 179

[56] References Cited

U.S. PATENT DOCUMENTS

| | | | |
|---|---|---|---|
| 4,700,022 | 10/1987 | Salvador et al. | 178/18 |
| 4,992,630 | 2/1991 | Mletzko | 178/18 |
| 5,159,159 | 10/1992 | Asher | 178/18 |

*Primary Examiner*—Stephen Chin
*Assistant Examiner*—Kevin Kim
*Attorney, Agent, or Firm*—Robert T. Martin

[57] ABSTRACT

Graphics tablet scanning and error reduction. Errors are detected and reduced by reading a plurality of points, sorting the points, and selecting the median point. Errors are detected and reduced by comparing the range of lowest to highest points with a preset limit and signaling an error if the limit is exceeded. Errors are detected and reduced in a resistive tablet by placing a load resistance on the output of the tablet and comparing the output voltage with predetermined limits, characterizing the contact area into valid and invalid contacts.

9 Claims, 2 Drawing Sheets

GRAPHICS TABLET SCANNING AND ERROR REDUCTION

BACKGROUND OF THE INVENTION

The present invention relates to computer input devices such as graphics tablets, touch pads, and touch screens.

Input devices for sensing the position of an object such as a finger tip or stylus tip in two dimension are in wide use as computer input devices. The uses of such devices include tablets and touch screens mounted in front of cathode ray tube or liquid crystal displays. A common construction for such tablets for displays uses two transparent members each with a uniform thin coating of a resistive material such as indium tin oxide (ITO). The coated members are held separated by a small distance. When a stylus or finger tip is pressed against one of the members, the two conductive surfaces are brought into contact forming a resistive voltage divider. Since the surfaces have a uniform resistance, by driving a potential difference across one member and measuring the voltage picked up on the other member, a voltage proportional to the position of the contact point in the driven member is transferred to the sense member. Reading this voltage gives the stylus position. Reading the position for the other axis involves switching the driven and sensing members. In this manner, the X-Y position of the stylus or finger tip can be read. By repeating readings, the position of the stylus or finger tip can be tracked.

Reading the position of a stylus or finger tip by reading the tablet voltage is commonly performed in the art by a microprocessor controlling an analog to digital converter. With a 12 bit analog to digital converter, the tablet surface is effectively divided into a grid of 4096 by 4096 points. The microprocessor typically makes hundreds of readings per second to track the position of the stylus or finger tip.

A number of problems exist with this scheme. Stable position readings require a single, stable contact point of a minimum size and a minimum pressure defined by the characteristics of the tablet. If the stylus or finger tip pressure on the tablet is too light, the contact point will not be stable, the sensed voltage will vary, and erratic readings will result. Another very common problem arises when a user unfamiliar with the device rests the palm of his or her hand on the tablet while writing with the stylus, presses on the tablet with multiple fingers at once, or presses on the tablet with a large object such as the thumb or heel of the hand. Large and multiple contacts result in varying voltages, causing erratic readings. Electrical noise generated in surrounding circuitry such as the display, electrical noise picked up from the surrounding environment, and noise generated by current flow in the resistive layers of the tablet also produce small variations in voltage, called jitter, that can result in erratic readings.

Because the computer system is making many tablet readings per second, these erratic readings may be interpreted to indicate very rapid movement, producing unintended results. What is needed is a simple way to scan a graphics tablet to reduce the effects of jitter and erratic readings, and to detect light pressure, multiple objects, and large objects on the tablet so that the computer system may take appropriate action.

SUMMARY OF THE INVENTION

The position of a stylus or like object on graphics tablet is scanned by sensing contact area, and processing multiple readings to form each position. By reading multiple data points, sorting them, and selecting the median point as the stylus position, errors are reduced without having to average a large number of points, or perform divisions. The list of points can be entered in sorted order as points are read, thus overlapping sorting with time required for data acquisition. Errors can be detected when the difference between the highest and lowest point in the sorted set exceeds a tolerance value. This tolerance value can be a static setting, or it can be adjusted dynamically. Contact area is sensed in a resistive tablet by placing a resistive load on the tablet, normally a technique to be avoided as it would introduce errors in position readings. By loading the tablet and comparing the voltage output with preset limits, light contacts, multiple contacts, and large contacts on the tablet surface can be detected. Such contacts occur from too light pressure on the stylus or fingertip used to operate the tablet, pressing the tablet with multiple fingers at once, or with the heel of the hand, nose, or thumb. By sensing contact area, and processing multiple points in the manner disclosed, erratic readings and the errors they cause are detected and greatly reduced.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 2b is the electrical equivalent of FIG. 2a;

DETAILED DESCRIPTION OF THE INVENTION

Figure 1A:
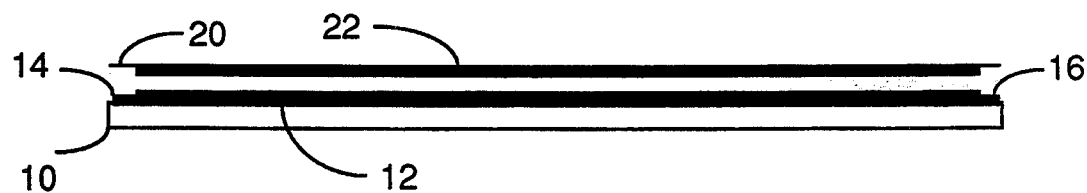
FIG. 1a is a cross section of a resistive tablet.
Figure 2A:
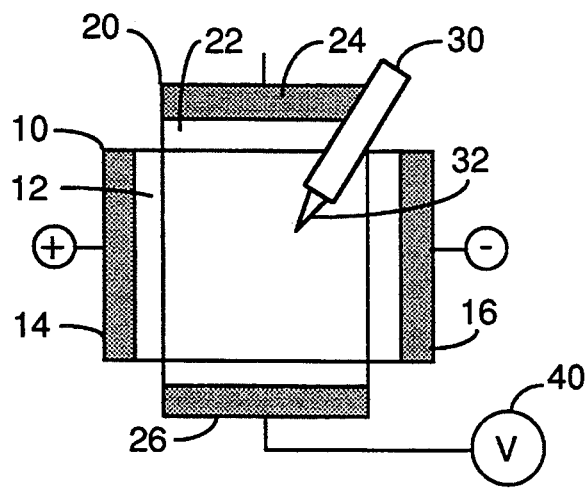
FIG. 2a is a schematic view of a resistive tablet.

FIGS. 1a and 2a show a typical resistive digitizing tablet. Bottom member 10 has a coating of a resistive material 12 such as indium tin oxide (ITO) usually 2 to 3 microns thick. Bottom member 10 may be a piece of glass, such as the face of a cathode ray tube, or the cover for a liquid crystal display, or may be a separate plastic sheet. Contact strips 14 and 16 are formed on opposing edges of coating 12 from a lower resistance material, such as silver. Top member 20 has a similar resistive coating 22, facing resistive coating 12. Resistive coating 22 also has contact strips 24, 26 on edges of resistive coating 22 perpendicular to contact strips 14, 16 on bottom member 10. Members 10 and 20 are held separated by spacing means (not shown) around the periphery of the members forming a gap between resistive coating 12 and resistive coating 22. Contact strips 14, 16, 24, and 26 provide for connection to driving and sensing circuitry. Such digitizing tablets are commercially available from vendors such as Scriptel Incorporated of Columbus, Ohio.

Figure 1B:
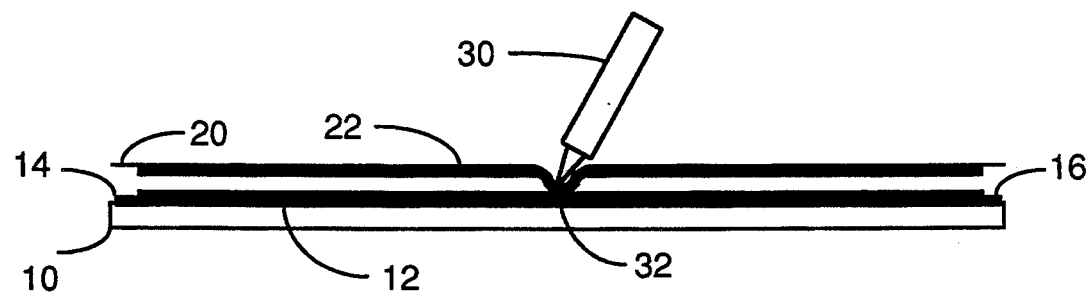
FIG. 1b is a cross section of the tablet of FIG. 1a in use.
Figure 2B:
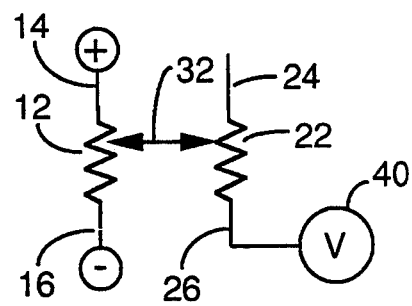

In operation as shown in FIG. 1b, stylus 30 presses against top member 20, deflecting top member 20 so that resistive coating 22 comes into contact with resistive coating 12 at contact point 32. FIG. 2a shows a top schematic view, and FIG. 2b shows the electrical equivalent. As shown in FIG. 2a, a potential difference is applied across bottom resistive coating 12, the X axis of the tablet via contact strips 14, 16. The voltage will vary across resistive coating 12 in proportion to the distance. For example, if contact 14 is connected to +5 volts and contact 16 is connected to 0 volts, the voltage along resistive coating 12 will vary from approximately 0 volts near contact 16 to approximately +5 volts near contact 14. When stylus 30 brings resistive coating 12 into contact with resistive coating 22 at point 32, the X axis voltage at point 32 is transferred from resistive coating 12 to resistive coating 22 and can be read by voltage sensor 40 via contact strips 24 and 26.

In computer based devices voltage sensor 40 is typically an analog to digital converter. If a 12 bit analog to digital converter is used (as is common in the art) the surface of the tablet is effectively divided into a grid of 4096 by 4096 points.

FIG. 2b shows the electrical equivalent of FIG. 2a. As explained above, with a potential difference driven across resistive coating 12, the voltage present on contacts 24 and 26 will be proportional to the position of stylus 30 along the X axis. To read the Y axis position of stylus 30 a potential difference is driven across resistive coating 22, and resistive coating 12 is used to sense the voltage. A voltage proportional to the Y axis position of stylus 30 will be present on contacts 14 and 16. Furthermore, by rapidly switching between driven member and sense member, the X-Y positions of a moving stylus can be tracked. This switching is accomplished through well known means, such as multiplexers or field effect transistor switches controlled by a microprocessor, and will be explained below.

The art teaches that accurate position sensing requires a high impedance device be used as voltage sensor 40. Assume that the X axis position of stylus 30 is being read. A potential difference is driven across resistive coating 12, and the position dependent voltage at point 32 is sensed through resistive coating 22 via contacts 24 and 26. With a high impedance placed on contacts 24 and 26, the voltage drop introduced by resistive coating 22 will be negligible. If a low resistance load is placed on contacts 24 and 26, however, a voltage drop will be developed across resistive coating 22. This voltage drop would be sensed as an apparent shift in position of stylus 30. To minimize this erroneous position shift, the loading on the sense member, resistive coating 22 in this example, must be minimized by keeping the load and impedance of voltage sensor 40 high.

Figure 3:
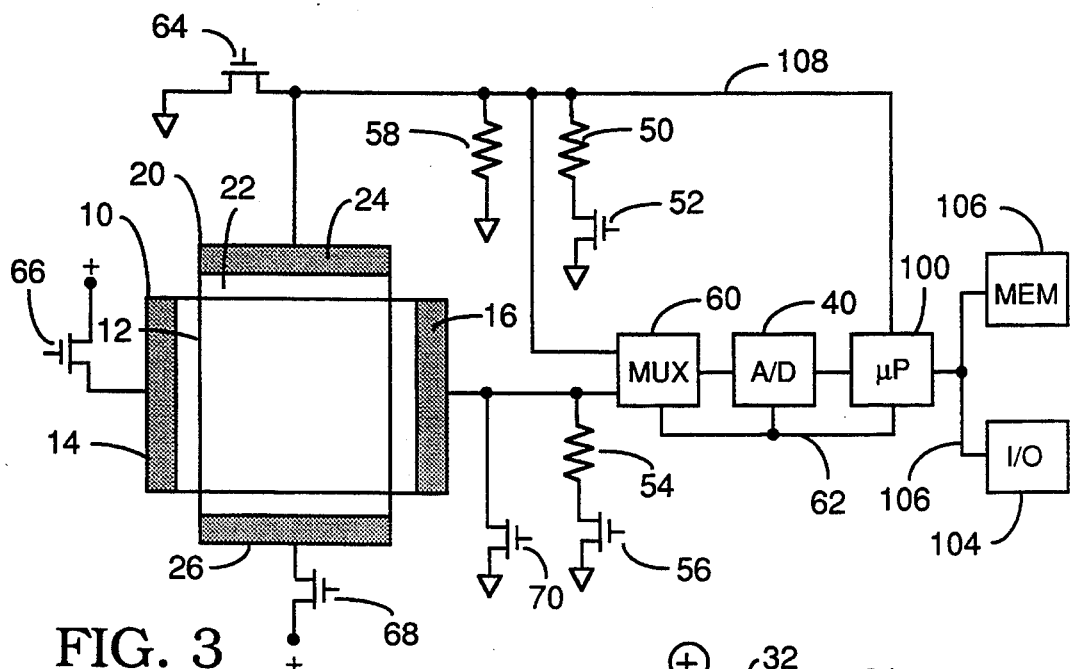
FIG. 3 is a schematic of the present invention.

FIG. 3 shows a schematic of the preferred embodiment of the present invention. As in FIG. 1 and 2, the tablet is composed of bottom layer 10 with resistive coating 12 and contacts 14 and 16. Top member 20 has resistive coating 22 and contacts 24 and 26. Multiplexer 60 under control of microprocessor 100 via control lines 62 routes the voltage from either contact 16 or contact 24 to analog to digital converter 40. Analog to digital converter 40 is controlled by microprocessor 100. Microprocessor 100 is connected to memory 102 which is used to store instructions and data, and to input/output devices 104 via data and control bus 106. Switches 64 through 70 are used for multiplexing drive and sense signals through the resistive coatings 12 and 22. Resistor 50 coupled with switch 52, and resistor 54 coupled with switch 56 form loads. Switches 52, 56, and 64 through 70 are controlled by microprocessor 100; the control lines from microprocessor 100 to each of the switches are not shown. Resistor 58 is a load resistor used in sensing stylus contact as described below. In the preferred embodiment, the resistance of resistive coatings 12 and 22 is approximately 40 thousand Ohms (40KΩ). Resistor 58 has a value of approximately 1 million Ohms (1MΩ) to minimize tablet loading errors. Load resistors 50 and 54 are approximately 10KΩ. Switches 52, 56, and 64 through 70 may be field effect transistor switches such as the 2N7002 manufactured by Motorola Semiconductor Products. These transistor switches have a very low resistance when turned on, on the order of 0.4 Ohms, and a very high resistance when turned off, on the order of several million Ohms. Multiplexer 60 may be fashioned from 2N7002 transistor switches, or may be part of the analog to digital converter. An analog to digital converter such as the AD7880 from Analog Devices may be used for analog to digital converter 40.

Before microprocessor 100 can sense the position of the stylus, it must detect that the stylus has made contact with the tablet. Switch 66 is turned on, and switches 52, 56, 64, 68, and 70 are in their high resistance off state. This applies voltage to resistive coating 12 through contact 14. With no contact between resistive coatings 12 and 22, load resistor 58 pulls line 108 to ground. When stylus pressure makes contact between resistive coatings 12 and 22, line 108 is pulled above ground level and sensed by microprocessor 100. In the preferred embodiment, line 108 is connected to an interrupt request line (IRQ) of microprocessor 100. The low to high transition of line 108 causes an interrupt to occur in microprocessor 100. In response to this interrupt, the stylus position is read and tracked.

To read the position of stylus 30, switches 52, 56, and 64 through 70 are in their high resistance off state. To read the X axis position, microprocessor 100 closes switch 66, connecting terminal 14 to a positive voltage, and closes switch 70, placing terminal 16 at ground. This places a voltage gradient across resistive layer 12. Contact point 32 transfers this voltage from resistive layer 12 to resistive layer 22 through contact 24 through multiplexer 60 to analog to digital converter 40. The voltage that microprocessor 100 reads from analog to digital converter 40 is proportional to the X axis position. To read the Y axis position of stylus 30, starting with all switches off, microprocessor 100 closes switch 68, connecting terminal 26 to a positive voltage, and closes switch 64, placing terminal 24 at ground. This places a voltage gradient across resistive layer 22. Contact point 32 transfers this voltage from resistive layer 22 to resistive layer 12 through contact 16 through multiplexer 60 to analog to digital converter 40. The voltage that microprocessor 100 reads from analog to digital converter 40 is proportional to the Y axis position of stylus 30.

One well known technique of reducing jitter and error in reading X or Y axis positions of stylus 30 is to take multiple measurements and average the data. Ten to twenty readings are taken and averaged. This approach has a number of drawbacks. First, a large number of readings must be taken and averaged, each reading taking a number of microseconds. Second, computing an average involves division, an operation that may not be present in very simple microprocessors, and when present takes much more time than simple addition. A division can be turned into a bit shift operation if the number of sample points is a power of two, but this quickly requires a large number of points, such as 32 or 64. Third, if a large object, such as a thumb or the palm of the user's hand is pressing on the tablet, producing erratic and wildly varying readings, these readings will be averaged to produce an artificial and erroneous result.

The present invention reaches a more reliable result than using one reading, or averaging a series of readings. The present invention takes a small number of readings, say five, seven or nine, sorts them, and picks the median value as the stylus position. The difference between highest and lowest reading is used to detect errors. If the difference between highest and lowest sorted reading is more than a specified error tolerance, an error is probable and error recovery strategies can be employed. Such strategies include ignoring the reading, retrying the reading, reusing the last non-erroneous position, delaying and retrying, testing the new position value to see if it is within an allowable range of the previous position, or alerting the user.

Assume that five X axis readings are taken from an analog to digital converter having a range from 0 to 1023, the values being the list {252, 256, 254, 252, 253}. This list is sorted to produce the list {252, 252, 253, 254, 256}. The median value, the third item on the list, 253, is taken as the X axis position. Assume the error tolerance is 20. The difference between largest and smallest readings in the list, 256−252=4, is within the error tolerance, so the reading of 253 is taken as valid. Assume that the X axis readings {258, 255, 904, 259, 256}are taken. This list is sorted to produce the list {255, 258, 259, 259, 904}. The median value, the third in the list, 259, is taken as the X axis position. The difference between largest and smallest readings in the list, 904−255=649, is greater than the error tolerance of 20, and indicates the reading may be erroneous.

The preferred embodiment counts the number of times that this process produces a result within the error tolerance, and the number of times the process produces a result outside the error tolerance. These counts are used to adjust the error tolerance, as described below. When a set of readings is rejected as having a difference between highest and lowest readings greater than the error tolerance, the set of readings is discarded and the operation retried.

The error tolerance is set from a number of factors, including the amount of noise and jitter expected in normal operation, and the speed with which a finger tip or stylus can legitimately expect to be moved in the time between taking successive position measurements. The value for the error tolerance can be a static value, or it can be dynamically altered during system operation. In the preferred embodiment, the error tolerance starts at a preset value, and is periodically adjusted so that a certain percentage (for example, 8 to 12%) of the readings taken will be discarded. If during the periodic adjustment too many readings are being discarded, the error tolerance is increased. If too few readings are being discarded, the error tolerance is decreased. The periodic adjustment of the error tolerance may be initiated by either the passage of time, such as once per minute, or it can be initiated by the accumulation of a certain number of readings, for example every one thousand readings.

This error reduction technique of the present invention is applicable to tablets in general, and is not restricted to resistive tablets. The method can be applied to the data from each axis individually, for example reading and processing X axis samples, then reading and processing Y axis samples, or (X,Y) pairs can be sampled and processed. Furthermore, the sorting of readings can be performed as a separate step after all readings are taken, or the readings can be kept in sorted order as they are acquired. For example, assume the first reading is taken as 255. It is entered as a list with one element, {258}. The next reading, 255, is taken. It is entered in the list in order, in this case before 258, to form the list {255, 258}. This insertion sort process continues with the remaining values as they are read. For the analog to digital converter used in the preferred embodiment, the conversion process takes approximately 17 microseconds from the time the microprocessor issues the command to start the conversion to the time when the converted data is available. Modern high speed microprocessors can execute many instructions during this period of time, so this conversion time can be used to perform the sorting process, overlapping the data acquisition and sorting processes and saving time. In operation, the preferred embodiment using seven to nine points achieves accuracy comparable to averaging 32 or 64 points.

The present invention also detects errors by sensing contact area in a resistive tablet. The contact area is sensed, and classified as no or minimal contact area, normal contact area, and large contact area. Normal contact area results from full stylus pressure on the tablet and produces stable position readings. No or minimal contact area results from no contact or a very light stylus contact on the tablet, and produces either no position reading, or erratic position readings. A large contact area results from large or multiple objects pressing on the tablet, such as the thumb, heel of the hand, nose, or multiple fingers. Such contacts also produce erratic position readings.

Where the art teaches that placing the tablet under load is to be avoided as a source of errors, the present invention senses contact area by measuring the voltage from the tablet under load and comparing this voltage to predetermined values.

Referring to FIGS. 2a and 2b, in normal operation determining the position of a stylus a potential difference is applied across member 12. Contact point 32 transfers a voltage proportional to position from member 12 to member 22. Although sense member 22 also has a variable resistance dependent on position of the contact point, there is little voltage drop across this resistance as the load on this member presented by resistor 58 and voltage sensor 40 is minimized. In the preferred embodiment, the value of resistive coatings 12 and 22 is approximately 40 KΩ. The value of resistor 58 is approximately 1 MΩ. Referring to FIG. 3, if a load is placed on the sense member, shown as resistor 50 coupled with switch 52, and resistor 54 coupled with switch 56, by closing either switch 52 or switch 56, a voltage drop occurs across the sense member. Separate load resistors can be used for each resistive layer, or a common load resistor can be used for both layers. The preferred embodiment uses separate load resistors, each with a value of 10 KΩ.

Figure 4A:
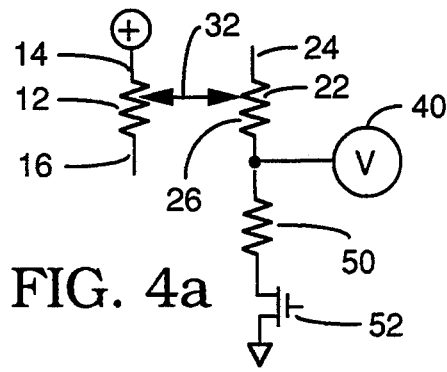
FIG. 4a is a simplified schematic of the present invention.
Figure 4B:
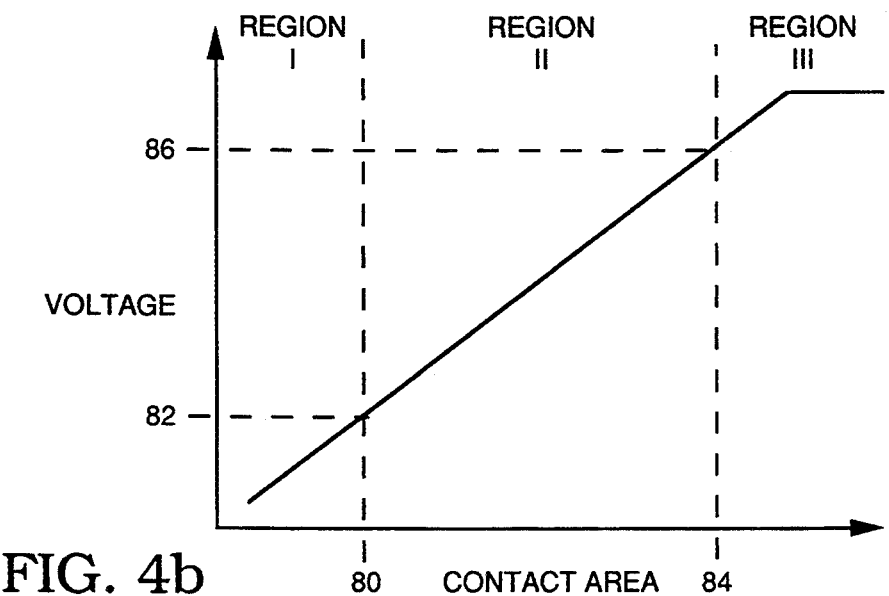
FIG. 4b is a response graph of the present invention.

FIG. 4a shows a simplified schematic of the resistive tablet under load. With switch 52 closed, resistor 50 loads the resistor network formed by tablet resistive layers 12 and 22 through contact point 32. FIG. 4b shows a graph of the voltage at sensor 40 vs. contact area. With no contact between the driven layer and the sense layer, removing contact 32 from FIG. 4a, an open circuit exists between driven member 12 and sense member 22. Voltage sensor 40 is grounded by load resistor 50 and closed switch 52, so its output is zero. With a normal stylus making full contact, voltage is transferred from driven member 12 to sense member 22. The voltage at sensor 40 is within the range shown as Region II in FIG. 4b, bounded by voltage levels 82 and 86. Lighter or partial contact, including no contact is represented as Region I, with a voltage below that shown as 82. Region III is the region where multiple contacts are present, or a large contact area is present on the tablet, the voltage at sensor 40 exceeding the level shown as 86.

The particular voltage levels shown as 82 and 86 are easily determined. By sweeping a stylus over the surface of the tablet in a raster pattern, left to right, top to bottom, the entire surface can be swept and the boundary voltages determined. These boundary voltages, and appropriate tolerances, can be determined and stored in permanent memory for the microprocessor. The boundary voltages can also be determined on an individual, unit by unit basis, as part of final testing, initial setup, or periodic adjustment.

Referring to FIG. 3, graphics tablet scanning to track the position of a stylus is done in the following phases:
1) Stylus down sense
2) X contact sense
3) X position sense
4) Y contact sense
5) Y position sense This process is repeated to track the movement of the stylus.

1) Stylus down sense

Referring to FIG. 3, microprocessor 100 closes switch 66. All other switches are in their off state. This applies voltage to resistive coating 12 through contact 14. With no contact between resistive coatings 12 and 22, load resistor 58 pulls line 108 to ground. When stylus pressure makes contact between resistive coatings 12 and 22, line 108 is pulled above ground level and sensed by microprocessor 100. In the preferred embodiment, this low to high transition of line 108 causes an interrupt to occur in microprocessor 100, and the tablet scanning process continues.

2) X contact sense

Microprocessor 100 closes switches 66 and 52. All other switches are in their off state. Multiplexer 60 is set via control lines 62 to route the voltage on contact 24 to analog to digital converter 40. Voltage is applied to resistive coating 12 through contact 14. Voltage is transferred through the contact point (not shown) to resistive coating 22 and contact 24. Analog to digital converter 40 is connected to contact 24 via multiplexer 60, as is load resistor 50 which is grounded by switch 52 to complete the load. Microprocessor 100 reads analog to digital converter 40, and checks the voltage against the predetermined operating limits. If the voltage is within proper limits, the X position is sensed. If the voltage is outside the predetermined limits, then other actions are taken. If the voltage is in Region I as shown in FIG. 4b, indicating the stylus is not contacting the tablet, the system can periodically recheck the tablet for contact. If the voltage is in Region III as shown in FIG. 4b, indicating multiple contacts or contact by a large object, an error is signaled. Error recovery can consist of repeating the X contact sense until a valid result is obtained, or displaying a user alert.

3) X position sense

Once a valid X contact is sensed, microprocessor 100 determines the X position by closing switch 70 and opening switch 52. Switch 66 remains closed from the X contact sense operation. With switches 66 and 70 closed, a voltage gradient is present on resistive coating 12, and is transferred via the contact point to resistive coating 22 and contact 24, through multiplexer 60 to analog to digital converter 40. Analog to digital converter 40 reads the X position. The X position is determined as described previously: multiple readings are taken, sorted, and the median value chosen and tested against limits. If the reading is within limits, Y contact is sensed. If the reading is out of limits, an error is signaled. In the preferred embodiment, an error causes microprocessor 100 to resume tablet scanning with phase 2, X contact sense.

4) Y contact sense

Y contact is sensed by microprocessor 100 opening all switches, and then closing switches 68 and 56. This applies voltage to resistive coating 22 through contact 26. Voltage is transferred through the contact point (not shown) to resistive coating 12 and contact 16. Analog to digital converter 40 is connected to contact 16 via multiplexer 60, as is load resistor 54 which is grounded by switch 56 to complete the load. Microprocessor 100 reads analog to digital converter 40, and checks the voltage against the predetermined operating limits and proceeding as in the X contact sense step above.

5) Y position sense

Once a valid Y contact is sensed, microprocessor 100 determines the Y position by closing switch 64 and opening switch 56. Switch 68 remains closed from the Y contact sense operation. With switches 64 and 68 closed, a voltage gradient is present on resistive coating 22, and is transferred via the contact point to resistive coating 12 and contact 16, via multiplexer 60 to analog to digital converter 40. Analog to digital converter 40 reads the Y position. The Y position is determined as described previously: multiple readings are taken, sorted, and the median value chosen and tested against limits. If the reading is within limits, the new X, Y position is returned. If the reading is out of limits, an error is signaled. In the preferred embodiment, an error causes microprocessor 100 to resume tablet scanning with phase 2, X contact sense.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential techniques of this invention as defined by the following claims.

What is claimed is:

1. In a graphics tablet, a method for determining a valid stylus position comprising the steps of:
   reading a plurality of sample points from the graphics tablet;
   sorting the sample points to form a sorted set of points; selecting the median sample point from the sorted set of points as the stylus position; and signaling an error if the difference between the highest and lowest points in the sorted set exceeds an error threshold value.

2. The method of claim 1 further comprising:

tracking the percentage of readings that have differences between the highest and lowest points in the sorted set exceeding the error threshold value as an error rate; and periodically examining the error rate and decreasing the error threshold value if the error rate is below a specified value and increasing the error threshold value if the error rate is above the specified value.

3. The method of claim 2 where the periodic examination of the error rate is initiated by accumulating a specified number of readings.

4. The method of claim 2 where the periodic examination of the error rate is initiated by the passage of a specified period of time.

5. In a graphics tablet, a method for determining a valid stylus position comprising the steps of:

reading a plurality of sample points from the graphics tablet;

sorting the sample points as they are read to form a sorted set of points;

selecting the median sample point from the sorted set of points as the stylus position; and signaling an error if the difference between the highest and lowest points in the sorted set exceeds an error threshold value.

6. The method of claim 5 further comprising:

tracking the percentage of readings that have differences between the highest and lowest points in the sorted set exceeding the error threshold value as an error rate; and periodically examining the error rate and decreasing the error threshold value if the error rate is below a specified value and increasing the error threshold value if the error rate is above the specified value.

7. The method of claim 6 where the periodic examination of the error rate is initiated by accumulating a specified number of readings.

8. The method of claim 6 where the periodic examination of the error rate is initiated by the passage of a specified period of time.

9. In a graphics tablet having first and second resistive surfaces, the method of determining a valid stylus position comprising the steps of:

applying a potential to the first resistive surface;

applying a load resistance to the second resistive surface;

reading the voltage on the second resistive surface;

signaling an error if the voltage is outside predetermined limits;

removing the load resistance from the second resistive surface;

reading a plurality of sample points from the second resistive surface;

sorting the sample points to form a sorted set of points;

selecting the median sample points from the sorted set of points as the stylus position;

signaling an error if the difference between the highest and lowest points in the sorted set exceeds an error threshold value;

tracking the percentage of readings that have differences between the highest and lowest points in the sorted set exceeding the error threshold value as an error rate; and periodically examining the error rate and decreasing the error threshold value if the error rate is below a specified value and increasing the error threshold value if the error rate is above the specified value.

* * * * *